United States Patent [19]
Carvalho et al.

[11] Patent Number: 5,451,141
[45] Date of Patent: Sep. 19, 1995

[54] PROPELLER PITCH CHANGE MACHANISM WITH INDUCTIVE BRAKE AND MOTOR

[75] Inventors: Paul A. Carvalho, Westfield, Mass.; John E. Games, Granby; Richard L. Bonnanzio, Milford, both of Conn.

[73] Assignee: United Technologies Corporation, Hartford, Conn.

[21] Appl. No.: 173,526

[22] Filed: Dec. 23, 1993

[51] Int. Cl.⁶ .............................................. B64C 11/44
[52] U.S. Cl. ..................................... 416/152; 416/162; 416/165
[58] Field of Search ........... 416/152, 155, 162, 168 R, 416/168 A, 165, 169 R

[56] References Cited
U.S. PATENT DOCUMENTS

| | | | |
|---|---|---|---|
| 2,620,887 | 12/1952 | Tiedeman et al. | 416/155 |
| 5,183,387 | 2/1993 | Huggett et al. | 416/152 |
| 5,199,850 | 4/1993 | Carvalho et al. | 416/162 |
| 5,205,712 | 4/1993 | Hamilton | 416/155 |
| 5,281,094 | 1/1994 | McCarthy et al. | 416/162 X |
| 5,282,719 | 2/1994 | McCarthy et al. | 416/152 |

*Primary Examiner*—Edward K. Look
*Assistant Examiner*—Michael S. Lee
*Attorney, Agent, or Firm*—Norman Friedland

[57] ABSTRACT

Pitch change for a variable pitch propeller or fan of the type utilized in a gas turbine engine is effectuated by the unique application of a bidirectional electrical induction AC motor and an electrical DC induction brake operatively connected to the pitch change actuator. The motor can be utilized in a slip speed range encompassing from a positive slip speed to zero slip speed and negative slip speeds which removes the limitations on the gear ratio.

17 Claims, 2 Drawing Sheets

PROPELLER PITCH CHANGE MACHANISM WITH INDUCTIVE BRAKE AND MOTOR

CROSS-REFERENCE TO RELATED APPLICATION

This disclosure discloses subject matter that may be disclosed and claimed in copending U.S. patent application Ser. No. 08/172,396, filed 12/23/93, entitled "Fuzzy Logic-Based Electro-Mechanical Pitch Change Engagement/Mode Selection Management System and Method" filed on event date herewith, and assigned to the same Assignee as this patent application and U.S. patent application Ser. No. 08/158051, now U.S. Pat. No. 5,391,055, entitled "Propeller Pitch Change Mechanism with Impulse Turbines" filed on Nov. 23, 1993 and also assigned to the same assignee.

TECHNICAL FIELD

This invention relates to pitch change mechanism of a variable pitch propeller or propulsor system of the type for powering aircraft, such as a ducted fan-type propulsor driven by a turbine engine and more particularly for pitch change mechanism system that utilizes an induction motor and induction brake.

BACKGROUND ART

With the advent of advanced ducted propulsors which utilize a variable pitch fan in the gas turbine engine, there has been a need for an effective, lighter and less expensive pitch change mechanism that will vary the pitch of the fan. It is well known that because the pitch change mechanism is mounted in the fan hub it must not only be light weight it also must be compact. To this end several concepts have been disclosed that attempt to serve this purpose and they include hydro-mechanical and electomechanical versions that incorporate either a ball screw and ball screw nut pitch change actuator or a hydraulic actuator.

U.S. Pat. No. 5,199,850 granted to E. H. Kusiak and P. A. Carvalho on Apr. 6, 1993 entitled "Pitch Stop Assembly For Variable Pitch Change Propulsor" and assigned to United Technology Corporation, the assignee common with this patent application discloses a mechanical pitch actuation system that is capable of being utilized in a ducted fan for gas turbine engines, sometimes referred to as Advanced Ducted Propulsor (ADP). As is disclosed in this patent, a well known ball screw actuator is utilized to effect pitch change movement. The ball screw actuator consists of a ball screw that during fixed pitch rotates at the same angular velocity as the fan. By virtue of a differential gear train operatively connected to the ball screw, an input signal to the differential gear train changes the rotational speed relationship of the differential gear train to the ball screw to effectuate a rotation of the ball screw to either a clockwise or counter clockwise direction for pitch change movement. The ball screw nut operatively connected to the ball screw is caused to translate. This rectilinear movement is converted to rotary movement of the fan blades by the trunnion eccentrically attached to the base of the fan blade. The motion from the ball screw nut to the trunnion is transmitted by a yoke and linkages to rotate the plurality of blades in unison about their longitudinal axis. Obviously, the input signal to the differential gear train will ultimately rotate the blades to either a course or fine pitch.

U.S. Pat. Nos. 5,183,387 and 5,205,712 granted to Huggert et al on Feb. 2, 1993 entitled "Fault-Tolerant Apparatus For Controlling Blade Pitch" and granted to Hamilton on Apr. 27, 1993 and entitled "Variable Pitch Fan Gas Turbine Engine", respectively, for example, disclose electrical pitch change mechanism. These patents disclose electrical induction machines with fixed windings cooperating with rotating windings fixed to the rotating fan shaft that are in a fixed pitch position until the electrical pitch change mechanism is actuated. Pitch change is effected by exciting the fixed winding to induce a braking effect of the rotating connecting mechanism that is translated to the fan blades through suitable linkages. Typically two or three induction machines are utilized to vary the pitch to course, fine blade angles and feather.

One of the systems contemplated for the ADP propeller pitch change mechanism is a dual electrical induction machine system that is operatively connected to the ball screw of the ball screw actuator similar to the one disclosed in U.S. Pat. No. 5,199,850. In this system the ball screw is rotated by a gear train which results in translating motion of the ball screw nut. This translating motion is converted into rotary motion at the blades through trunnions attached to the base of each blade.

To change pitch, two electrical induction machines are utilized; one for increase pitch and the other for decrease pitch. Each induction machine includes a stator winding and a squirrel cage rotor. The rotor winding is mounted around the engine output shaft and by energizing the stator winding the magnetic field in the gap between the winding varies to impart a braking effect on the rotor. The rotor of each induction machine drives a ring gear that is operatively connected to the feed drive that drives the ball screw. One of the rotors is directly connected thereto while the other imposes a gear train between the rotor output shaft and the ball screw so as to impart rotation in a direction that is opposite to the direction of the other induction machine. Hence, one of the induction machines serves to position the blades toward fine pitch change and the other serves to position the blades toward course pitch change. The rotors of both induction machines are mounted on the engine output shaft connected to the ball screw gear train with a feed through gear. By energizing one of the windings of either induction machines, the angular velocity of that rotor excited by that winding becomes retarded relative to the engine shaft to drive the rotary ball shaft and in turn translate the ball screw nut. The trunnion eccentrically mounted to the base of the blade coupled to the translating ball screw nut converts the axial motion to rotary motion for varying the pitch of the blade.

It has been found that this system has certain limitations which is predicated by the necessary gear ratio between the rotors and blade pitch change axis in combination with the maximum torque loading conditions. The maximum gear ratio is sized by the minimum fan speed (30%) plus the maximum beta rate (reversing—30°/sec). Under this condition a minimum slip speed between the inductive machine rotors and the stationary coils must be maintained for the machines to produce the required torque. The condition that determines the torque requirement of the inductive machines is the 100% speed case which requires only half the beta rate. This system is also limited because pitch change can only be effectuated when the fan is rotating. Hence, in this system, an additional inductive machine with motoring capabilities is required for static conditions.

We have found that we can obtain a less complex, lighter weight and smaller envelope system which requires fewer components by incorporating a DC inductive brake and a bidirectional AC inductive motor uniquely used in combination to optimize gear ratio which minimizes size and weight of the inductive machines. The two inductive machines are connected to a single rotor assembly. The rotor assembly, in turn, is connected to the ballscrew gear train via a single feed through gear. This design eliminates the need for a second rotor assembly, eliminates one induction machine required for static conditions, eliminates the reversing idler gear and reduces the torque requirements of the remaining inductive machines by allowing an increase in the gear ratio to the blades.

According to this invention, the inductive brake would be used in the increase pitch direction at the maximum load case (100%). For increase pitch at the lower fan RPM (30%) and the higher beta rates (30°/sec.) a combination of brake operation at high slip speed and motor operation at low slip speed would be used. This mode of operation allows a higher gear ratio between the inductive machines and the blade pitch change axis, reducing the torque requirements at the induction machine. The motor can be used in a range of slip speeds that extend for positive slip speed through to zero slip speed and to negative slip speeds. Obviously, the reduction of the torque requirements greatly reduces the weight and envelope of the inductive machines. As used herein and understood in this technology, slip speed is the relative rotation between the stator and rotor of the inductive machine.

Additionally, instead of utilizing an independent inductive machine for feather as is the case in the heretofore known design the inductive motor is utilized for both pitch change toward decrease pitch and the independent feather function.

SUMMARY OF THE INVENTION

An object of this invention is to provide an improved pitch change system for a propeller or a gas turbine engine driven ducted fan utilizing an inductive brake and an inductive motor.

This invention judiciously utilizes the inductive brake and motor combination in a unique pitch change actuation system. The inductive machines are electro-magnetically coupled to a common rotor assembly that inputs the pitch change actuator to effectuate pitch change of the fan or propeller blades and eliminates the need for a second rotor assembly, eliminates another inductive machine which would otherwise be needed for static operating conditions, eliminates the reversing idler gear and reduces the torque requirements of the inductive brake/motor by allowing an increase in the gear ratio to the blades. This invention is characterized as being lighter, requiring a smaller envelope and requiring fewer components than heretofore known electrical pitch change systems.

A feature of this invention is that the inductive motor is utilized for the slip speed range that includes positive slip speed through zero slip speed to the negative slip speed thereby removing the limitation on gear ratio.

A feature of this invention is to effectuate increase pitch change at low fan speeds with the combination of a bidirectional AC inductive motor and a DC brake where the motor is operative at low slip speed conditions and the DC brake is operative at the high slip speed conditions. Increased pitch for high fan speeds is effectuated by the inductive DC brake.

The foregoing and other features of the present invention will become more apparent from the following description and accompanying drawings.

BEST MODE FOR CARRYING OUT THE INVENTION

This invention discloses the preferred embodiment and illustrates this invention schematically. It being understood that the implementation of the invention may take the form of any conventional and well known propeller and ADP components. The induction machines are commercially available electromagnetic machines and are of the type disclosed in U.S. Pat. No. 5,183,387, supra. The induction motor is of the type that includes a rotor with a low electrical resistance and is operated by alternating current. The induction brake is of the type that includes a rotor with a high electrical resistance and is operated by direct current. As will be described in more detail hereinbelow, the induction motor and brake are mechanically locked to each other via a common rotor assembly and are mounted around and electro-mechanically linked to the engine fan or propeller output shaft. Under steady-state conditions, this linkage would be normally locked, so that the motor/brake rotor assembly rotates at the same speed as the output shaft. To obtain pitch change, the appropriate electromagnetic machine is selected and energized, torque imbalance is created at the rotor assembly with a desired differential speed between the rotor assembly and the output shaft. The torque at the desired differential speed is produced by the appropriate excitation of the DC brake or AC motor. The slip speed with this torque is then converted to blade pitch rotation via a feed-through gear and the pitch change actuator.

Figure 1:
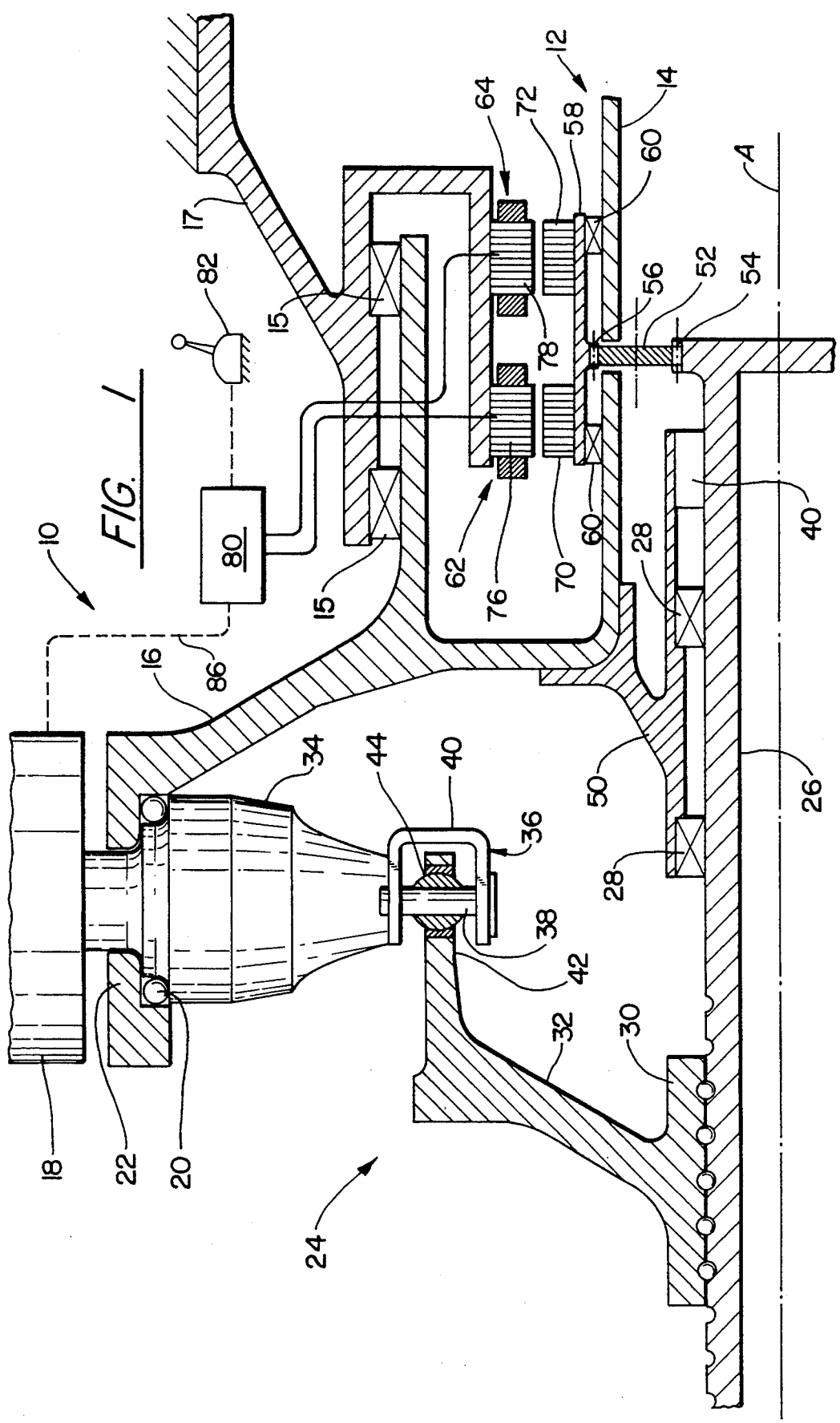
FIG. 1 is a schematic illustration of the pitch change actuation system utilizing an induction brake and induction motor combination.

As noted in FIG. 1 the variable pitch change fan generally indicated by reference numeral 10 and pitch change actuator generally indicated by reference numeral 12 are schematically illustrated as comprising an output shaft 14 suitably connected to the main-turbine engine shaft via a gear box (neither being shown) for driving the hub or disk 16 supported for rotation around the engine's axis A by bearings 15 supported to the fixed housing 17. A plurality of circumferentially disposed fan blades 18 (one being shown) are suitably supported by the bearings 20 in barrel 22 formed in disk 16 for pitch change motion around the longitudinal axis A. Typically, in a fan application the fan would include 12 to 24 blades.

The pitch change actuator generally indicated by reference numeral 24 comprises the ball screw 26 rotatably supported by bearings 28 around the engine's axis A, ball screw nut 30, yoke 32, trunnion 34 and the connection mechanism 36 interconnecting the yoke 32 and trunnion 34. The trunnion 34 is eccentrically connected to the base of the fan blades 18 so that translating the ball screw nut 30 causes the fan blades 18 to rotate about the longitudinal axis B. To obtain pitch change motion the ball screw 26 is caused to rotate relative to the rotation of the output shaft 14 which in turn causes the ball screw nut 30 threadably connected to the ball screw 26 to move in the fore or aft direction. This motion in turn is transmitted to each of the fan blades 18 via the yoke 32, the connecting mechanism 36 attached to each of the blades and the blade's trunnion 34. The connecting mechanism 36 may take any suitable conventional mechanism and in this embodiment includes a pin 38 supported to the end of the trunnion 34 by clevis 40 and rod end 42 integrally formed in yoke 34. Rod end 42 is operatively connected to the pin 38 through a spherical joint 44 and is in sliding relationship relative to each other. This mechanism is disclosed and claimed in a Patent Application U.S. Ser. No. 08/147,236 filed on Oct. 28, 1993 and entitled "Propeller Pitch Change Mechanism" by Paul Carvalho, the co-inventor of this patent application and assigned to United Technologies Corporation, the assignee common to this patent application. It will be appreciated to those skilled in this art that lock means other than the noback spring may be equally employed. As for example, the locking solenoid means disclosed in co-pending U.S. patent application Ser. No. (Atty. Docket No.: 311-006 [H2336-ED], supra, may be utilized.

A suitable noback spring 48 is disposed between the ball screw 26 and the shaft connecting support 50 to assure that the twisting moment from the blade doesn't impact the ball screw 26. That is to say the spring noback 40 assures that rotation of the ball screw is only in the direction imparted thereto by the input of the pitch change actuator control system and prevents reverse rotation that may be inadvertently caused by the blades attempting to drive the ball screw 26. Noback springs are well known and are conventional in propeller pitch change actuators. For more details of the noback spring reference should be made to U.S. Pat. No. 5,199,850, supra, incorporated herein by reference.

Input to the ball screw 26 is obtained by the feed-through gear 52 which meshes with spur gear 54 attached to the end of ball screw 26 and ring gear 56 attached to rotor 58 supported by output shaft by bearings 60. As will be described hereinbelow rotor 58 is coaxially supported around the axis A and is concentrically disposed relative to the ball screw 26. It should be understood that the selection of the location of the motor and brake is arbitrary as the motor could be just as well located where the brake is presently located and vice versa.

To obtain pitch change, and in accordance with this invention, a pair of induction machines are operatively connected to rotor 58. The inductive machine 62 is an AC motor and the inductive machine 64 is a DC brake. Both induction machines are physically similar and are optimized for different modes of operation to minimize the electrical power requirements of the system. The DC induction brake is designed to operate at conditions for which the fan blades generate forward thrust and the blade aerodynamic and centrifugal loads are high. To obtain pitch change for conditions when the fan is operating at a lower speed and at higher beta rates a combination of the bidirectional AC induction motor and DC brake is utilized. This is graphically illustrated in FIG. 2 which shows fan speeds plotted at various blade angles for various actuator loads.

Figure 2:
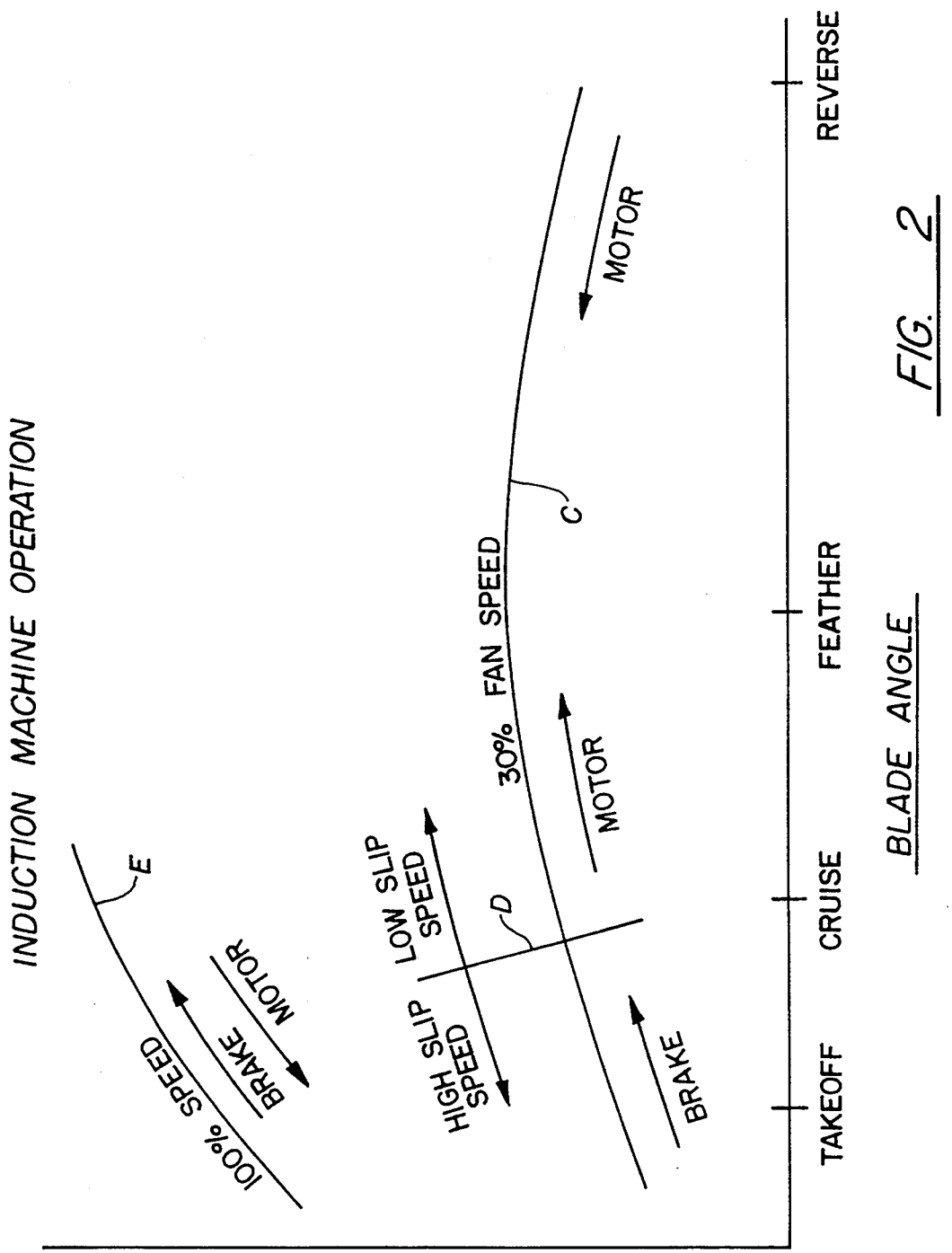
FIG. 2 is a graph plotting fan speed vs. actuator load for illustrating the operative modes of the inductive motor and inductive brake of this invention.

As is apparent from an inspection of FIG. 2, the DC brake is energized for increased pitch when the fan speed is low as represented by curve C, say 30% fan speed, and the slip speed is sufficiently high; i.e. to the left of the transition line D. The transition point is predicated as a function of the brake design and gear ratio and typically this transition occurs at a 15°/sec beta rate. At the high fan speed, say 100%, as represented by curve E, the DC brake is energized for increase pitch. The motor or brake of the combination of the two can be utilized for decrease pitch and the particular mode of operation will depend on whether a noback spring or other locking means is used and the magnitude and direction of the loads imposed by the blades.

The squirrel cage rotors 70 and 72 around the common rotor assembly are magnetically coupled to the windings 76 and 78 of the inductive machines 62 and 64 respectively. A suitable control indicated by the box 80 responding to the control lever 82 imputed by the aircraft operator is electrically connected to the induction machines 62 and 64 to energize the system to obtain pitch change movement. Once energized, the induction brake or induction motor imparts a differential torque to the rotor assembly 56 which, in turn, drives the ball screw 26 via the ring gear 56, feed-through gear 52 and spur gear 54 to convert the torque imbalance to pitch change motion through the pitch change actuator 24. A suitable feed back system interconnecting the blade and the control system 80 as represented by the dash line 86 provides information to the control as to the actual position of the blades for precisely controlling the pitch of the blades. Although any suitable digital electronic control can be employed utilizing well known computer technology, a suitable control system is described in a co-pending patent application being filed on even date entitled "Fuzzy-Logic-Based Electro-Mechanical Pitch Engagement/Mode selection Management System and Method", by Allan J. Volponi and Jason B. Solomonides, supra, and assigned to United Technologies Corporation, the assignee of this patent application.

As mentioned in the above, the inductive brake 64 serves to increase pitch direction at the maximum load case (100%) up to 15°/sec beta rate. Increase pitch at the lower fan speed (30%) and the higher beta rates (30°/sec) is obtained by the combination of the brake 64 and motor 62. Namely, the brake operation is activated for high slip speeds and the motor operation is activated for low slip speeds. This allows the pitch change system to utilize a higher gear ratio between the inductive machines 62 and 64 and the blade pitch change axis, with a consequential reduction in the torque requirements. Not only is the inductive motor 62 utilized to effectuate pitch change toward decrease pitch it also can be utilized for the independent feather function. As mentioned in the above paragraphs, this invention allows the design of the pitch change system to have less components, require a smaller envelope and be lighter in weight than heretofore known systems.

Although this invention has been shown and described with respect to detailed embodiments thereof, it will be appreciated and understood by those skilled in the art that various changes in form and detail thereof may be made without departing from the spirit and scope of the claimed invention.

It is claimed:

1. The method of controlling the pitch of the blades of a variable pitch propeller or variable pitch fan driven by a gas turbine engine comprising the steps of:
   providing an actuator to change the pitch of the blades including a ball screw, ball screw nut and a trunnion eccentrically connected to the base of the blades;

providing a DC induction brake and a bidirectional AC motor operatively connected to the ball screw;

energizing the DC inductive brake at a first slip speed and sequentially energizing the AC inductive motor at a second slip speed, said first slip speed being greater than said second slip speed.

2. The method of controlling the pitch of the blades of a variable pitch propeller or variable pitch fan driven by a gas turbine engine as claimed in claim 1 wherein the transition from the brake mode of operation to motor operation in the step of energizing occurs at a predetermined slip speed which is a function of blade RPM and beta rate.

3. The method of controlling the pitch of the blades of a variable pitch propeller or variable pitch fan driven by a gas turbine engine as claimed in claim 1 including the further step of energizing the motor to obtain feathering of the blades when the RPM of the blades equals zero.

4. The method of controlling the pitch of the blades of a variable pitch propeller or variable pitch fan driven by a gas turbine engine as claimed in claim 3 including providing a control and including the step of transmitting a signal to the induction motor and induction brake to perform the steps of energizing and including a feed back system to provide information to the control to indicate the pitch position of the blades.

5. The method of controlling the pitch of the blades of a variable pitch propeller or variable pitch fan driven by a gas turbine engine comprising the steps of:

providing an actuator to change the pitch of the blades including a ball screw, ball screw nut and a trunnion eccentrically connected to the base of the blades;

providing a DC induction brake and a bidirectional AC motor operatively connected to the ball screw;

energizing the DC inductive brake at a first slip speed to increase pitch of the blades and sequentially energizing the AC inductive motor at a second slip speed, said first slip speed being greater than said second slip speed;

energizing the AC motor to decrease pitch.

6. The method of controlling the pitch of the blades of a variable pitch propeller or variable pitch fan driven by a gas turbine engine as claimed in claim 5 when the brake RPM in the step of energizing the induction brake and sequentially energizing the induction motor is substantially equal to 30% of the designed blade and beta rate of the pitch change is substantially equal to 15°/sec.

7. Apparatus for changing the pitch of the blades of a variable pitch propeller or a variable pitch fan driven by a gas turbine engine, comprising mechanical means for changing the pitch of the blades, means operatively connected to said mechanical means for controlling said mechanical means including a bidirectional AC induction motor and a DC induction brake, control means responsive to an input signal to sequentially control said bidirectional AC induction motor and said DC induction brake to increase pitch of said blades when rotation of the blades around the propeller or fan axis and beta rate result in a slip speed which is at a level to generate torque in the decrease direction and to control said bidirectional AC induction motor to increase pitch at all other slip speeds, and to control said AC bidirectional motor to decrease pitch.

8. Apparatus for changing the pitch of the blades of a variable pitch propeller or a variable pitch fan driven by a gas turbine engine as claimed in claim 7 including means to feather the blades at zero blade RPM, said means including said bidirectional AC motor.

9. Apparatus for changing the pitch of the blades of a variable pitch propeller or a variable pitch fan driven by a gas turbine engine as claimed in claim 7 wherein said mechanical means includes a ball screw, a ball screw nut threadably connected to said ball screw, a yoke attached to said ball screw nut, and connection means operatively connected to said yoke to rotate said blades about their pitch change axis.

10. Apparatus for changing the pitch of the blades of a variable pitch propeller or a variable pitch fan driven by a gas turbine engine as claimed in claim 9 including a trunnion eccentrically attached to the base of each of said blades and said yoke including a plurality of rod ends each of which are operatively connected to said trunnion of each of said blades.

11. Apparatus for changing the pitch of the blades of a variable pitch propeller or a variable pitch fan driven by a gas turbine engine as claimed in claim 10 wherein said connection means includes a clevis attached to the end of said trunnion of each of said blades, a pin supported by said clevis and said pin mounted in sliding relationship with each of said rod ends.

12. Apparatus for changing the pitch of the blades of a variable pitch propeller or a variable pitch fan driven by a gas turbine engine as claimed in claim 11 wherein said connecting means includes a spherical joint interconnecting said rod end and said pin.

13. Apparatus for changing the pitch of the blades of a variable pitch propeller or a variable pitch fan driven by a gas turbine engine as claimed in claim 9 including a common rotor operatively connected to said DC induction brake and said bidirectional AC induction motor.

14. Apparatus for changing the pitch of the blades of a variable pitch propeller or a variable pitch fan driven by a gas turbine engine as claimed in claim 9 including a common rotor operatively connected to said DC induction brake and said bidirectional AC induction motor and gear train means interconnecting said rotor and said ball screw whereby said ball screw is rotated in clockwise and counter clockwise directions.

15. Apparatus for changing the pitch of the blades of a variable pitch propeller or a variable pitch fan driven by a gas turbine engine as claimed in claim 14 wherein said connecting means includes a trunnion eccentrically attached to the base of each of said blades and said yoke including a plurality of rod ends each of which are operatively connected to said trunnion of each of said blades.

16. Apparatus for changing the pitch of the blades of a variable pitch propeller or a variable pitch fan driven by a gas turbine engine as claimed in claim 15 wherein said connecting means includes a clevis attached to the end of said trunnion of each of said blades, a pin supported by said clevis and said pin mounted in sliding relationship with each of said rod ends.

17. Apparatus for changing the pitch of the blades of a variable pitch propeller or a variable pitch fan driven by a gas turbine engine as claimed in claim 16 wherein said connecting means includes a spherical joint interconnecting said rod end and said pin.

* * * * *

UNITED STATES PATENT AND TRADEMARK OFFICE
CERTIFICATE OF CORRECTION

PATENT NO. : 5,451,141

DATED : September 19, 1995

INVENTOR(S) : Paul A. Carvalho, John E. Games, Richard L. Bonnanzio

It is certified that error appears in the above-identified patent and that said Letters Patent is hereby corrected as shown below:

On the title page: Item [54] and Column 1, line 1

PROPELLER PITCH CHANGE MECHANISM WITH INDUCTIVE BRAKE AND MOTOR

Signed and Sealed this

Sixteenth Day of January, 1996

*Attest:*

BRUCE LEHMAN

*Attesting Officer*     Commissioner of Patents and Trademarks